BEST AVAILABLE COPY

T858,005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 42

S 327,682

THERMAL REFLOW ACRYLIC LACQUERS, METHODS OF USING THE SAME, AND METALS COATED THEREWITH

Donald A. Maxwell, P.O. Box 511, Kingsport, Tenn. 37662

Filed Apr. 3, 1967. Published Jan. 7, 1969
Class 260—17
No Drawing. 9 Pages Specification

The addition of a metal deactivator, e.g., a chelating compound, to acrylic lacquer formulations which do not contain oxidatively curable drying oils or the like prevents the formation of white surface film resulting from intense ultraviolet radiation.